March 31, 1953     W. R. MILLER     2,633,508
TIME SWITCH MECHANISM
Filed Sept. 18, 1946     3 Sheets-Sheet 1
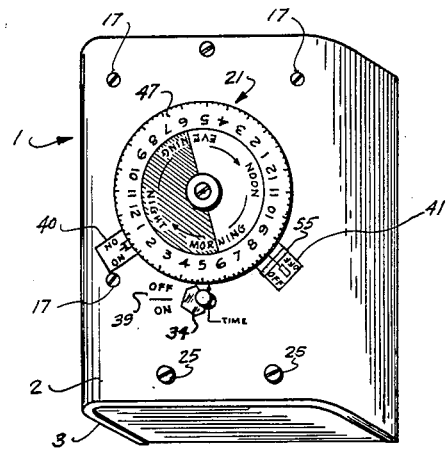
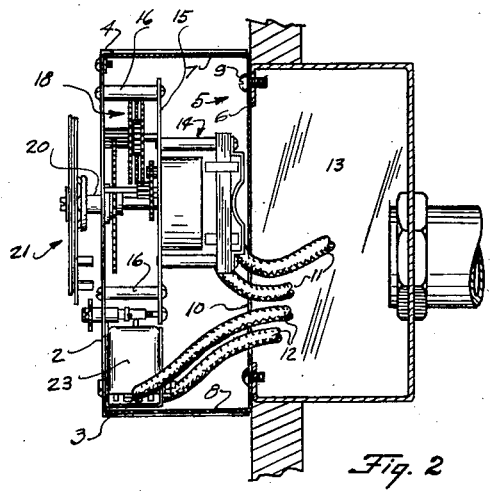
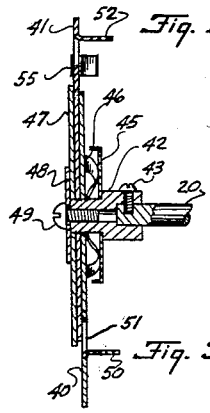
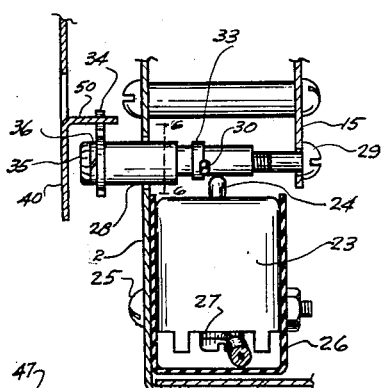
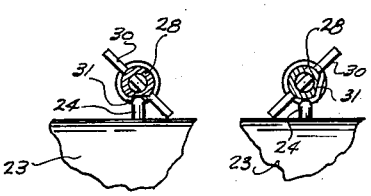
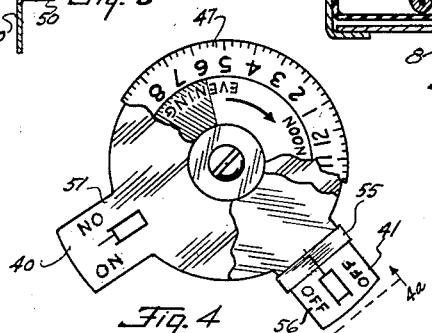
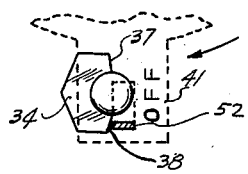
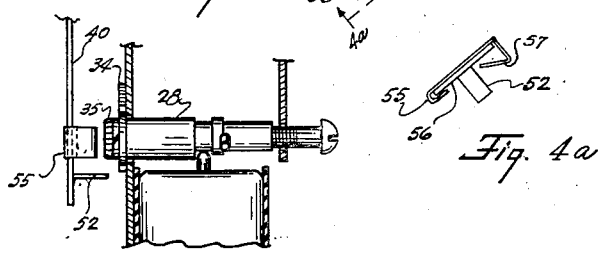
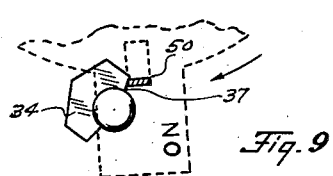
INVENTOR.
Wayland R. Miller
BY John L. Harris
ATTORNEY March 31, 1953 W. R. MILLER 2,633,508
TIME SWITCH MECHANISM
Filed Sept. 18, 1946 3 Sheets-Sheet 2

INVENTOR.
Wayland R. Miller
BY
John L. Harris
ATTORNEY

March 31, 1953 W. R. MILLER 2,633,508
TIME SWITCH MECHANISM
Filed Sept. 18, 1946 3 Sheets-Sheet 3

INVENTOR.
Wayland R. Miller
BY John L. Harris
ATTORNEY

Patented Mar. 31, 1953

2,633,508

UNITED STATES PATENT OFFICE 2,633,508

TIME SWITCH MECHANISM

Wayland R. Miller, Milwaukee, Wis.

Application September 18, 1946, Serial No. 697,815

20 Claims. (Cl. 200—38)

1

This invention relates in general to automatic controls and is more particularly concerned with timing devices.

The primary object of the invention is to provide a time switch which is simple and rugged in construction and which is easy to understand and use by the user.

A further object of the invention is to provide a timer construction in which adjustments may be made without requiring any tools.

A further object is to provide a device on which the operating parts are protected from tampering by the user and in which the user is protected from all danger of injury from exposed moving parts or electrical shock.

Another object is to provide a novel friction drive which permits adjustments to be made easily and which protects the drive mechanism from injury by the user.

A further object is to provide an arrangement which indicates the position of the control mechanism and which also provides for manual operation of the control mechanism independently of the automatic operating mechanism.

Another object is the provision of a time switch which selectively provides continuous automatic on-off operation or requires manual intervention to condition the device for an "on" operation or an "off" operation.

Other objects will appear from the following description and appended claims.

Figure 11:
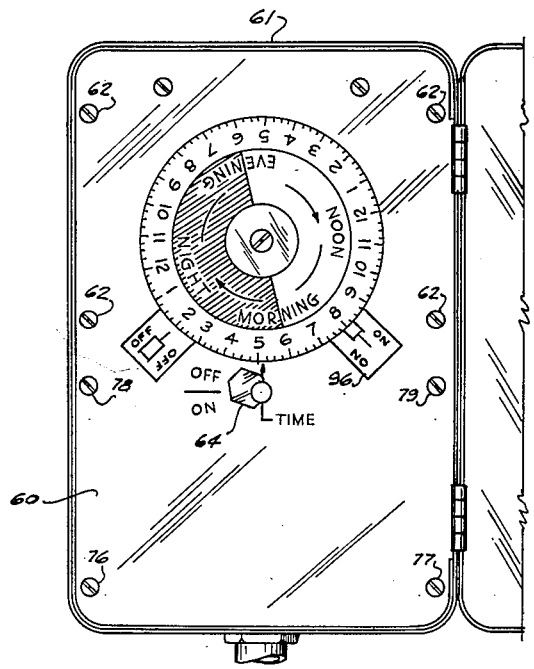
Figure 12:
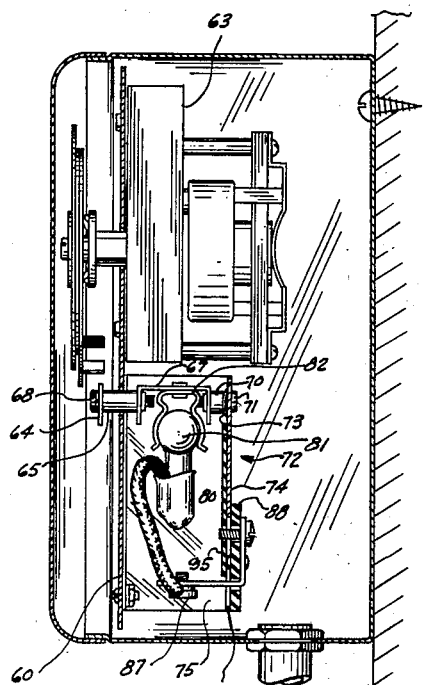
Figure 14:
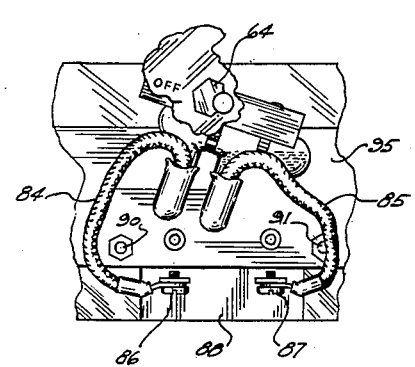
Figure 13:
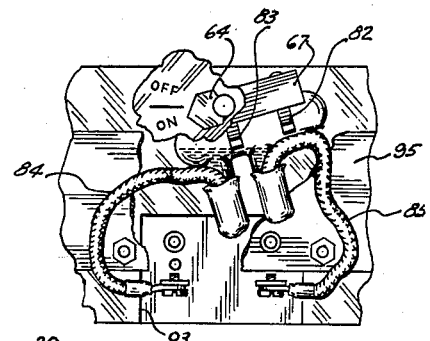
Figure 10A:
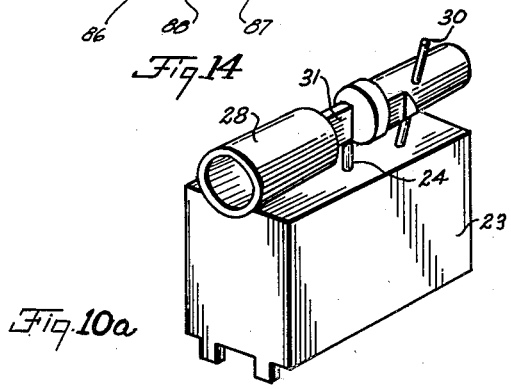
Figure 16:
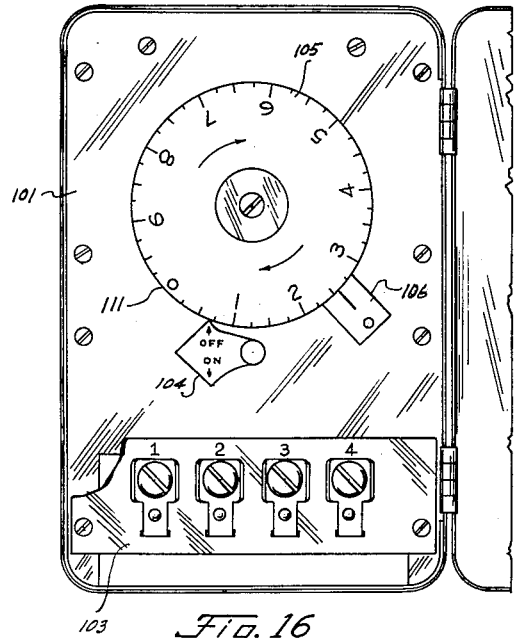
Figure 17:
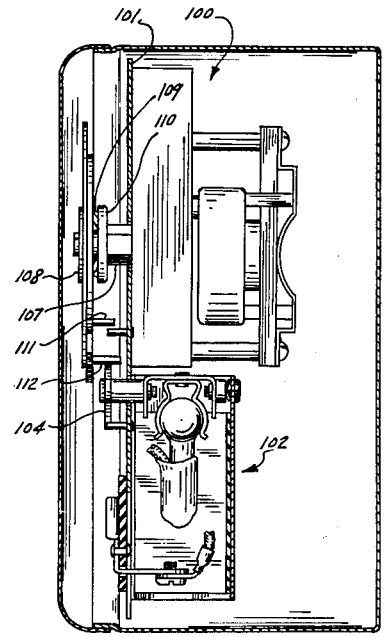
Figure 18:
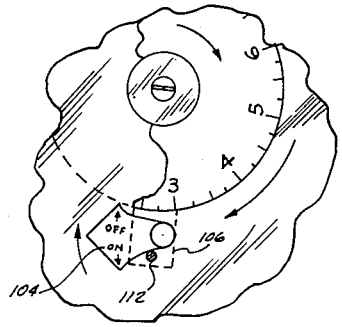
Figure 19:
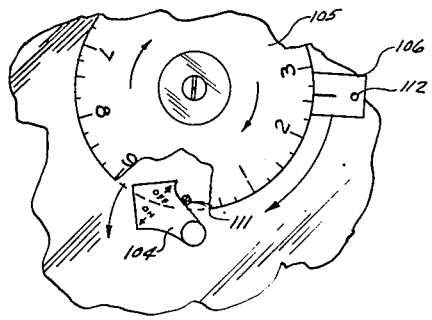
Figure 15:
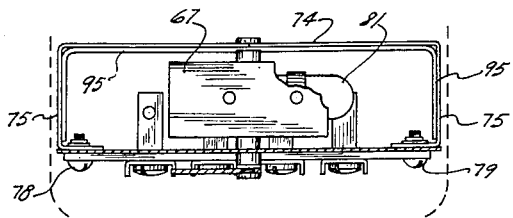

For a full disclosure of the invention reference is made to the following detailed description and to the accompanying drawings in which, Fig. 1 is a front view of a timer embodying one form of the invention, Fig. 2 is a side sectional view of the timer and showing the method of mounting on a wall, Fig. 3 is a sectional view of the dial and actuator assembly, Fig. 4 is a front view of the dial assembly with parts broken away to show other parts, Fig. 4A is a fragmentary view taken on line 4A—4A of Fig. 4, Fig. 5 is an enlarged sectional view showing the switch mounting and actuating mechanism, Fig. 6 is a fragmentary sectional view taken on line 6—6 of Fig. 5, Fig. 7 is a view similar to Figure 6 but showing the operating shaft in a different position, Fig. 8 is a schematic view indicating operation by the "off" actuator, Fig. 9 is a similar view showing operation by the "on" actuator, Fig. 10 is a view similar to Fig. 5 but showing the operating shaft in a different longitudinal position, Fig. 10A is an enlarged perspective view showing the action of the cam on the switch plunger, Fig. 11 is a front view with the cover open of a modified form of the invention, Fig. 12 is a sectional view of Fig. 11, Fig. 13 is a fragmentary view with parts broken away to show the mercury switch in one position, Fig. 14 is a similar view showing the mechanism in another position, Fig. 15 is a top view of the mercury switch housing construction, Fig. 16 is a front view of another modification of the invention, Fig. 17 is a side sectional view of Fig. 16, Fig. 18 is a fragmentary view showing operation of the switch by one actuator, Fig. 19 is a similar view showing operation of the switch by another actuator.

Referring to Fig. 1, reference character 1 indicates generally a housing. This housing is preferably formed of a front cover member 2 which is generally U-shaped and provided with beads 3 and 4 at the bottom and top respectively. This cover fits over a mounting bracket 5 which is also generally U-shaped having a base portion 6 adapted to be secured to a wall, and outwardly extending top and bottom portions 7 and 8. The base portion 6, is provided with mounting holes for receiving screws 9, which are received in the conventional tapped holes of a standard electrical switch or wall box. The base portion 6 of the mounting bracket is also provided with an enlarged hole 10, through which motor leads 11 and switch leads 12 extend from the interior of the housing 1 into the interior of the wall box 13.

Located inside of housing 1 is a synchronous timing motor 14. This motor is shown as mounted on a gear train bearing plate 15, which is secured to the front of the housing by spacers 16 and mounting screws 17. Located between the plate 15 and the front of the cover member 2, is a gear train 19, which is driven by the synchronous motor 14. This gear train terminates in a final drive shaft 20, which may be journaled between the gear train plate 15 and the cover 2. As shown in Figure 2, the final shaft 20, extends through the front of the cover and carries a dial assembly generally indicated as 21.

As shown more clearly in Fig. 5, the cover 2 also serves to mount an enclosed snap switch 23. This switch is of a form well known in the art and is provided with an operating plunger 24. The snap switch 23, preferably, is of the type known as "normally open." That is, when the plunger 24 is released, the switch snaps to open position. When this plunger is depressed to its operating point the switch snaps to closed position, thereby completing a circuit between the switch leads 12. The snap switch 23 is fastened to the cover member 2 by means of screws 25 which extend through suitable mounting holes in the snap switch base. Preferably a U-shaped insulating member 26 surrounds the switch 23 so as to shield the exposed terminals 27 from the bottom portion 8 of the mounting bracket.

The plunger 24 of the snap switch is operated by means of a rotary cam shaft 28. At its front end this cam shaft is journaled in the cover member 2. The rear end of the cam shaft is supported by a screw 29, which is journaled in the gear train plate 15. This screw is threaded into the cam shaft and abuts a stop pin 30. As shown in Figs. 6 and 7 the cam shaft is formed of a generally round cross section but is provided with a flat section 31. When the shaft is in the position shown in Fig. 6 the plunger 24 of the snap switch 23 engages the flat section of the cam shaft and the plunger is thus in its outer position in which the switch is open. When the shaft is rotated in a counterclockwise direction the plunger 24 is pushed inwardly for causing the snap switch to close. It will be noted that when the cam shaft is in the position shown in Figure 7, the plunger 24 of the snap switch is riding on the circular portion of the cam shaft. As a result the outward force of the plunger 24 causes no turning moment on the cam shaft and the cam shaft, therefore, will remain indefinitely in this position. The stop pin 30 serves to engage the top of the snap switch housing and prevents the cam shaft from turning beyond predetermined limits. It will be noted that the cam shaft 28 is provided with a shoulder 33. The purpose of this shoulder will become apparent as this description proceeds.

Attached to the front end of the cam shaft is an operating member or cam 34. This cam is preferably held in place by means of a screw 35, provided with a lock washer 36. The screw 35 is threaded into a suitable tapped hole in the cam shaft. As shown more clearly in Figures 8 and 9 the cam or operating means 34, is provided with an upper engageable surface 37 and a lower engageable surface 38, these surfaces being on opposite sides of the axis of the cam shaft. The cam 34 is also formed as a pointer for cooperating with indicia 39 on the front of the cover to indicate whether the switch is on or off.

The cam 34 is actuated between the on and off positions by means of adjustable actuators 40 and 41 which form part of the dial assembly 21. Referring to Figures 3 and 4 the dial assembly consists of a hub member 42 which is attached to the motor shaft 20 by means of a set screw 43. This hub member is provided with a reduced front portion upon which are rotatably mounted a rear friction plate 45, a spring 46, the "on" actuator 40, the "off" actuator 41 and a dial 47. These elements are compressed together by means of a front friction plate 48 which is held rigidly against the front end of the hub by means of a screw 49. This arrangement provides a friction means or drive between the hub, the actuators and the dial. With this arrangement the actuators may be manually moved to any desired position on the dial and the dial may be rotated to the proper time setting as indicated by the arrow on the front of the case. This friction drive permits the user to make these adjustments without the use of any tools. The friction drive also serves to protect the gear train and motor from damage by the user. In other words, the friction limits the amount of torque that can be applied by the user to the final shaft 20. This torque may be made well below that which would cause damage to the motor or gear train mechanism by manual rotation of the dial. As shown in Figures 3 and 4, the actuators 40 and 41 preferably are flat and have large circular portions behind the dial 47. These large circular portions provide friction surfaces between the actuators and also between the front actuator and the dial. The actuator 40 is provided with a rearwardly extending ear 50, which is preferably punched out from the material of the actuator leaving a hole 51. As shown in Figs. 5 and 9, the ear 50 is located on the actuator 40 at a point above the axis of the cam shaft 28, this ear being adapted to engage the upper engageable portion 37 of the cam means. The actuator 41 is provided with a similar ear 52 as shown in Figs. 8 and 10. This ear is located on the actuator below the axis of cam shaft 28 and is adapted to engage the lower engageable portion 38 of the cam means.

From the description thus far it will be apparent that as the dial assembly is driven clockwise by the motor, the ear 52 of the "off" actuator 41 will engage the lower engageable portion of the cam 34. Upon continued rotation of the actuator the cam 34 will be driven in a clockwise direction until the ear 52 rides off the edge of the engageable portion 38. At this time the cam will point to the word "off" on the front of the case, and the shaft 28 will be rotated to the position shown in Figure 6. It will be noted that in this position the flat portion of the cam is engaging the plunger, thereby permitting the plunger to move to its outermost position in which the snap switch contacts are open.

An important feature of the present invention is the cam arrangement which provides for snap action movement of the cam shaft as it is rotated from the "on" position to the "off" position. When the cam shaft is in its "on" position, the plunger 24 is engaging the circular portion of the cam shaft which neutralizes the turning effect of the plunger 24. This permits the cam shaft to remain in the "on" position until it is moved away from this position either manually or by the "off" actuator. As the "off" actuator begins to turn the cam shaft in a clockwise direction away from the position shown in Figure 7, the plunger of the snap switch rides off the circular portion of the cam on to the flat portion. At this time a turning moment is developed and the outward spring action of the plunger causes the cam shaft to rapidly move to its "off" position. In other words, at this time the spring action of the plunger 24 actually causes the cam shaft to rotate to its "off" position. In other words, at this time the spring action of the plunger 24 actually causes the cam shaft to rotate to its "off" position independently of the ear 52 of the "off" actuator. This rapid movement of the cam shaft takes place before the plunger travels far enough to snap the switch to its open position. Thus, at the time the plunger reaches the snap open position it is travelling rapidly and all danger of diminishing contact pressure or frying action of the contacts is avoided.

After actuation of the cam shaft to its "off"

position by the actuator, the shaft remains in this position until the upper engaging surface 37 of the cam is engaged by the ear 50 of the "on" actuator. It will be apparent that clockwise movement of the "on" actuator will result in counterclockwise rotation of the cam and shaft until it reaches the "on" position. At this time the upper engaging surface 37 of the cam is disengaged by the ear 50 which continues its travel while the cam 34 remains stationary in the "on" position, the shaft then remaining in this position as described above.

As will be apparent from an inspection of Figures 5 and 10 the cam shaft 28 is movable axially. When the shaft is pulled out as shown in Fig. 5 the cam 34 is engageable by the ears 50 and 52 of the "on" and "off" actuators respectively. With the shaft in this outer position the switch mechanism is moved automatically from "on" to "off" and vice versa in the manner above described. However, when the shaft is pushed inwardly as shown in Fig. 10, the cam 34 is out of the path of the ears 50 and 52 and as a result, operation of the timing motor will have no effect on the switch position and the switch will remain indefinitely in the position to which it is last moved. The purpose of the ridge 33 on the cam shaft is to hold the shaft in either its inner or outer positions. Thus when the shaft is pushed to the inner position the ridge 33 must pass over the plunger 24 of the switch which plunger is spring pressed outwardly against the cam shaft. This requires a slight force to overcome the force of the plunger. This requirement for a slight force for pushing or pulling the shaft insures that the shaft will remain in the position to which it is intentionally moved.

In many cases it is desirable to provide semi-automatic operation instead of either full manual operation or full automatic operation. For example, when the time switch is used for controlling attic fans, it is desirable to prevent the time switch from turning on the fan unless a manual operation is interposed for conditioning the time switch to perform this function. To obtain this result the clip 55 is provided on the "off" finger. This clip consists of a thin spring member one end of which is bent around the extending portion 56 of the actuator and terminates short of the ear 52. The other end of the clip 55 is bent rearwardly at 56 and then inwardly at 57. The portion 57 forms an inclined plane. This portion follows the ear 52 in the clockwise rotation of the actuator and is adapted to engage the head of the screw 35. In operation the ear 52 of the actuator first engages the cam 34 for rotating the cam shaft to the "off" position. On continued rotation of the actuator the inclined plane 57 of the clip engages the head of the screw 35. Thus continued rotation of the actuator forces the shaft inwardly to the position shown in Figure 10. The shaft will then remain in this inner "off" position until reset manually. Assuming the time switch is employed for controlling an attic fan the user on desiring the attic fan to run at a certain time, pulls the shaft to its outer position as shown in Figure 5. Thus the next time the "on" actuator passes the cam, it will actuate the switch to the "on" position.

If fully automatic operation is desired the clip is slipped outwardly on the actuator to a point in which it does not engage the screw 35.

As an alternative the clip 55 may be removed from the actuator.

It would be noted that the cam 34 in addition to providing automatic operation of the switch mechanism by the timer motor and indicating the switch position, also provides a manual operator for the switch. In other words, the user can turn the switch from "off" to "on" or vice versa at any time.

Referring to the embodiment of the figures shown in Figs. 11, 12, 13 and 14, this embodiment shows the invention applied to a time switch utilizing a mercury switch instead of a snap switch as in the embodiment first described. In the present embodiment of the invention the motor and switch mechanism are mounted on a panel 60 which is supported in an enclosure 61 by means of mounting screws 62 which are threaded into suitable brackets in the enclosure. The panel 60 at its upper portion supports a motor and gear train mechanism 63 having a final drive shaft which rotates a dial and actuator assembly of the same type hereinbefore described. This assembly actuates a cam 64 which is secured to the end of a shaft 65 which extends through a hole or bearing in the panel 60. The shaft 65 is fastened to a U-shaped bracket 67 by a screw 68. The screw 68 serves to hold the cam 64 against the shaft 65 and holds the shaft 65 rigidly to the bracket 67. The rear end of the bracket 67 is supported by a shaft 70 which is held in place by a screw 71 threaded into the bracket 67. The shaft 70 is formed with a shoulder extending through a bracket 72. The head of the screw 71 engages the inner end of the shaft for providing a rigid construction. Preferably a friction washer 73 is located between the bracket 72 and the shoulder of the shaft 70 for providing a slight amount of friction resisting turning of the assembly formed of shaft 65, bracket 67 and shaft 70. The bracket 72 is generally U-shaped having a back portion 74 and side portions 75 having inturned ends (see Fig. 15) provided with holes for receiving mounting screws 76, 77, 78 and 79 which hold the bracket to the panel 60. The bracket 72 and the front panel, therefore, provide an enclosure for completely enclosing the space 80 except for openings at the top and bottom. This enclosure serves to house a mercury switch 81 which is held in clips 82 and 83 which are secured to the channel member or bracket 67. The leads 84 and 85 from the mercury switch are attached to terminals 86 and 87 which are mounted on a terminal panel 88. This terminal panel is secured to the rear of the bracket 72 by screws 90 and 91. The rear portion 74 of the bracket 72 is provided with a notch 93 for providing electrical clearance between the terminals and the bracket. Preferably a liner of insulation material 95 is provided for the bracket 72, this serving to prevent the mercury switch leads from rubbing against the metal of the bracket.

In operation it will be apparent that when the cam 64 is engaged by the "on" actuator 96 it will be rotated to its "on" position as indicated by Fig. 13 in which the mercury switch is tilted for closing the circuit. When the cam 64 is operated by the "off" actuator it assumes the position shown in Fig. 14 in which the mercury switch is tilted for breaking the circuit. The friction spring 71 serves to overcome the spring action of the leads 84 and 85 and holds the switch in either the "on" position or the "off" position.

Referring to the embodiment of the invention shown in Figs. 16, 17, 18 and 19 a timer motor and gear train mechanism 100 is mounted on a panel 101 which is mounted in a suitable hinged enclosure. The panel 101 also supports a mercury switch mechanism 102 which may be identical with the construction described in the previous embodiment of the invention. In this case a terminal panel 103 is shown on the front panel instead of on the rear of the mercury switch bracket as in Fig. 12. This terminal panel contains a pair of terminals for the synchronous motor mechanism 100 and also carries a pair of terminals to which the mercury switch leads are connected.

The previous embodiments show the invention applied to what is known as a 24-hour time switch. In such devices the function is to make and break a circuit at predetermined times of the day. The function of the present embodiment is to make and break a circuit for certain percentages of time regardless of the actual time.

Reference character 104 indicates a cam which is mounted on the shaft which is adapted to tilt the mercury switch in the same manner as described in the previous embodiment.

The dial and actuator assembly on this embodiment consists only of a dial 105 and an actuator 106 which are mounted on the hub 107 along with the front friction plate 108, friction spring 109 and rear friction plate 110. The construction is, therefore, substantially the same as previously described.

The dial is provided with a pin 111 which extends inwardly for engaging the upper surface of the cam 104. As will be apparent from inspection of Fig. 19, on clockwise rotation of the dial the pin 111 will cause counterclockwise rotation of the cam 104, this in turn rotating the mercury switch to the "on" position.

The actuator 106 is provided with an inwardly extending pin 112. This pin is located on the actuator in a position for engaging the lower surface of the cam 104. On clockwise rotation of the actuator this pin engages the lower cam surface to cause clockwise movement of the cam 104, this tilting the mercury switch to the "on" position.

In operation the dial and actuator assembly is rotated continuously in a clockwise direction at constant speed by the motor and gear train mechanism 100. It will be apparent that the percentage of time that the switch is in the "on" position is dependent on the position of the actuator 106 relative to the dial 105. Thus the dial on movement to the zero position (the pin location) causes the mercury switch to be tilted to the "on" position. The switch will remain in this position until it is shifted to "off" position by the pin 112 of the actuator 106. Thus, if the actuator is positioned at "1" on the dial, the switch will remain in the "on" position for only 1/10 of a revolution of the dial and actuator assembly. If, however, the actuator is placed at "3" on the dial the switch will remain in the "on" position for 3/10 of a revolution. The position of the actuator on the dial thus determines the percentage of time that the switch is "on" and the percentage of time the switch is "off."

From the foregoing description it will be apparent that the present invention provides a simple and positive construction for timing devices of general application. The invention also provides for protection of the working parts from the user and makes it easy for the user to make proper adjustments for the operation desired. While I have shown and described only three embodiments of the invention it will be understood that many changes in construction may be made without departing from the spirit and scope of the invention. It is, therefore, desired to be limited only by the scope of the appended claims.

What is claimed is:

1. In a timing mechanism, in combination, a panel, a drive shaft extending through the panel, motor means located behind the panel for rotating said drive shaft, a pair of actuators located in front of the panel and rotated by the drive shaft in a plane substantially parallel with the panel, a driven shaft extending through the panel, said driven shaft being substantially parallel to the drive shaft and laterally offset therefrom, control mechanism located behind the panel and operated by rotation of the driven shaft, said motor means and control device being mounted on the panel so that the panel serves as a base for both, cam means attached to the driven shaft in front of the panel and having a first engageable portion on one side of the driven shaft in front of the panel and a second engageable portion on the other side of said driven shaft, one of said actuators engaging the first engageable portion of the cam means for rotating the driven shaft in one direction and the other of said actuators engaging the second engageable portion of the cam means for rotating the driven shaft in the opposite direction.

2. A mechanism as defined in claim 1 in which the cam means is formed to provide an indicator, and indicia on the panel for indicating the position of said driven shaft.

3. In a timing mechanism, a panel, a drive shaft extending through the panel substantially perpendicular thereto, motor means located behind the panel for rotating the drive shaft, a hub mounted on the drive shaft in front of the panel, abutment means at the front of the hub, a pair of actuators rotatably mounted on the hub, spring friction means on the hub, for pressing said actuators together and toward said abutment means to provide a friction drive between the hub and said actuators, a driven shaft extending parallel to the drive shaft and extending through the panel at a point laterally spaced from the drive shaft, a switch located behind the panel and operated from open to closed position by rotation of said driven shaft, said motor means and switch being mounted on the panel so that the panel serves as a base for both, and cam means mounted on the driven shaft in front of the panel, one of said actuators being constructed and arranged to actuate the cam means in a manner to operate the switch to open position, and the other actuator being constructed and arranged to actuate the cam means in a manner to operate the switch to closed position.

4. In a timing mechanism, a panel, a drive shaft extending through the panel substantially perpendicular thereto, motor means located behind the panel for rotating the drive shaft, a hub mounted on the drive shaft in front of the panel, abutment means at the front of the hub, a pair of actuators rotatably mounted on the hub, spring friction means on the hub and spaced from the abutment means by the actuators, said spring friction means pressing the actuators toward said abutment means to provide a friction drive between the hub and said actuators, a driven shaft extending parallel to the drive shaft and extending through the panel at a point laterally spaced from the drive shaft, a switch located behind the panel and operated from open to closed position by rotation of said driven shaft, said switch and motor means being mounted on the panel so that the panel serves as a base for both, and cam means mounted on the driven shaft in front of the panel, said cam means having a first engageable portion extending from the driven shaft on the side thereof toward the drive shaft and a second engageable portion extending from the driven shaft on the side thereof opposite the drive shaft, one of the actuators being arranged to engage the first engageable portion of the cam means for rotating the driven shaft in one direction and the other of said actuators being arranged to engage said second engageable portion of the cam means for rotating said driven shaft in the opposite direction.

5. A mechanism as defined in claim 4 in which the cam means is formed of a single piece also providing an indicator, and indicia on the panel cooperating with said cam means for indicating the position of the switch.

6. In a timing mechanism, a panel, a drive shaft extending through the panel substantially perpendicular thereto, motor means located behind the panel for rotating the drive shaft, a control shaft extending through the panel at a point spaced from the drive shaft, switching means located behind the panel and operated by rotation of the control shaft, a cam mounted on the control shaft adjacent the front end thereof, said cam having a first engageable portion on the side of the control shaft toward the drive shaft and having a second engageable portion on the side of the control shaft opposite said drive shaft, said cam also being formed to provide an indicator, indicia on the panel cooperating with said cam to indicate the position of the control shaft and hence the position of said switching means, a pair of actuators mounted on said drive shaft and extending therefrom a distance greater than the distance between said drive shaft and the second engageable portion of said cam, said actuators being identical blanks, and tongues struck out from the actuators at different distances from said drive shaft, a tongue on one actuator being adpated to engage the first engageable portion of the cam and a tongue on the other actuator being adapted to engage the second engageable portion of said cam.

7. A time switch mechanism comprising a housing including a front member and a base member, a timing motor and gear train mechanism mounted on the rear of the front member and having a drive shaft extending through said front member, a dial and actuator assembly carried by said shaft and located at the front of said front member, an electric switch mechanism also mounted on the rear of said front member, a switch operating shaft extending through the front member, a cam carried by the switch operating shaft and adapted to be actuated by said actuator assembly, flexible pigtail lead wires for the timing motor and switch mechanism adapted for splicing with housewiring, said base member being formed to support the front member and having mounting holes therein adapted for registration with the screw holes of a standard house wiring switch box whereby said base member may be readily mounted over such a box, said base member also having an enlarged opening therein providing substantial communication between the interior of the housing and the interior of the switch box over which it is mounted, thereby permitting the pigtail leads for the motor and switch mechanism to be located in part in said switch box after installation.

8. A time switch mechanism comprising a housing including a front member and a base member, a timing motor and switch mechanism located in said housing, means exterior of the housing for adjusting the time of operation of the switch mechanism by the timing motor, flexible pigtail lead wires for the timing motor and switch mechanism adapted for splicing with housewiring, said base member being formed to support the front member and having mounting holes therein adapted for registration with the screw holes of a standard house wiring switch box whereby said base member may be readily mounted over such a box, said base member also having an enlarged opening therein providing substantial communicaiton between the interior of the housing and the interior of the switch box over which it is mounted, thereby permitting the pigtail leads for the motor and switch mechanism to be located in part in said switch box after installation.

9. In a time switch mechanism, in combination a switch having an operating element movable in one direction for operating the switch to one position and movable in the opposite direction for operating the switch to another position, a rotatable shaft adjacent said operating element, said shaft being rotatable in opposite directions, cam means on the shaft engaging said operating element for moving the operating element back and forth upon rotation of the shaft, said operating element being biased against said cam means, and said operating element and cam means being correlated so that upon rotation of the cam means to a predetermined position, the component of force of the operating element tending to cause reverse rotation of the cam means becomes neutralized, whereby the cam means may remain stationary, the parts being arranged so that said component force is sufficient to overcome all motion retarding forces on the cam means, whereby upon reverse rotation of the cam means said component of force reappears to cause movement of the cam means with snap action, a timing motor, a first actuator, a second actuator rotated by said timing motor, and means engageable by said actuators for causing one actuator to rotate the shaft in a first direction for moving the switch to one of its positions and for causing the other actuator to rotate the shaft in the opposite direction for moving the switch to another of its positions; said actuators being constructed and arranged to rotate the shaft sufficiently to move the cam means beyond said predetermined position.

10. In an automatic switch mechanism, in combination, a switch, a shaft arranged to actuate said switch, said shaft being mounted for both rotary and longitudinal movement, a second shaft spaced from said first shaft, a movable actuator operated by said second shaft, said actuator having a first cam surface for imparting rotary movement to the shaft and having a second cam surface for imparting longitudinal movement thereto.

11. In an automatic switch mechanism, in combination, a switch, a shaft arranged to actuate said switch, said shaft being mounted for both rotary and longitudinal movement, a timing motor, a first actuator rotated by said timing motor and arranged to rotate said shaft, and a second actuator rotated by the timing motor arranged to impart longitudinal movement to said shaft.

12. In a time switch mechanism, in combination, a switch having an operating element movable in one direction for operating the switch to one position and movable in the opposite direction for operating the switch to another position, a rotatable shaft adjacent said operating element, said shaft being rotatable in opposite directions, cam means on the shaft engaging said operating element for moving the operating element back and forth upon rotation of the shaft, said operating element being biased against said cam means, and said operating element and cam means being correlated so that upon rotation of the cam means to a predetermined position the component of force of the operating element tending to cause reverse rotation of the cam means becomes neutralized, whereby the cam means may remain stationary, the parts being arranged so that said component of force is sufficient to overcome all motion retarding forces on the cam means, whereby upon reverse rotation of the cam means said component of force reappears to cause movement of the cam means with snap action.

13. In an automatic control device, the combination of, a drive shaft, timing motor means for rotating the drive shaft, a driven shaft laterally spaced from the drive shaft and mounted for both rotary and longitudinal movement, control mechanism operated by rotation of the driven shaft, said control mechanism being constructed and arranged so that its position is independent of the longitudinal position of the shaft, an actuator rotated by the drive shaft and adapted to rotate the driven shaft as it passes adjacent the same, and means rotated by said drive shaft for imparting longitudinal movement to said driven shaft.

14. In an automatic control device, the combination of, a drive shaft, means for rotating the drive shaft, a driven shaft laterally spaced from the drive shaft, control means operated by said driven shaft, said driven shaft being mounted for both rotary and longitudinal movement, an actuator rotated by the drive shaft and arranged to pass adjacent the driven shaft, first and second cam surfaces on the actuator, first and second cam surfaces on the driven shaft, said cam surfaces being constructed and arranged to cause both rotary and longitudinal movement of the driven shaft by rotary motion of said drive shaft.

15. In an automatic control device, the combination of, a drive shaft, means for rotating the drive shaft, a driven shaft laterally spaced from the drive shaft, control means operated by said driven shaft, said driven shaft being mounted for both rotary and longitudinal movement, a pair of actuators rotated by the drive shaft and arranged to pass adjacent the driven shaft, cooperating cam surfaces between one actuator and the driven shaft for causing rotary motion of the driven shaft as said one actuator passes the driven shaft, and cooperating cam surfaces between the other actuator and the driven shaft for causing longitudinal motion of the driven shaft as said other actuator passes by the driven shaft.

16. In a timing mechanism, in combination, a panel, a drive shaft extending through the panel, motor means located behind the panel for rotating said drive shaft, a pair of actuators located in front of the panel and rotated by the drive shaft in a plane substantially parallel with the panel, a driven shaft extending through the panel, said driven shaft being substantially parallel to the drive shaft and laterally offset therefrom, control mechanism located behind the panel and operated by rotation of the driven shaft, cam means attached to the driven shaft in front of the panel and having a first engageable portion on one side of the driven shaft and a second engageable portion on the other side of said driven shaft, one of said actuators engaging the first engageable portion of the cam means for rotating the driven shaft in one direction and the other of said actuators engaging the second engageable portion of the cam means for rotating the driven shaft in the opposite direction, said driven shaft being longitudinally movable to a position in which the cam means is not engageable by said actuators, whereby the device may be rendered automatic or non-automatic.

17. In a time switch mechanism, in combination a switch having an operating element movable in one direction for operating the switch to one position and movable in the opposite direction for operating the switch to another position, a rotatable shaft adjacent said operating element, said shaft being rotatable in opposite directions, cam means on the shaft engaging said operating element for moving the operating element back and forth upon rotation of the shaft, said operating element being biased against said cam means, said cam means having an operating section causing substantial travel of the operating member upon rotation of the shaft when said operating section engages the operating element, said cam means also having a generally circular portion, which causes substantially no travel of the operating element upon rotation of the cam means when said circular portion engages the operating element, the operating element transferring its engagement from the operating portion of the cam means to the circular portion thereof at a predetermined angular position of the cam means, said cam means being freely supported for rotation, whereby the cam means moves with snap action when it is rotated in the reverse direction past said predetermined position, a timing motor, a first actuator, a second actuator rotated by said timing motor, and means engageable by said actuators for causing one actuator to rotate the shaft in a first direction for moving the switch to one of its positions and for causing the other actuator to rotate the shaft in the opposite direction for moving the switch to another of its positions, said actuators being constructed and arranged to move the shaft sufficiently to move the cam means beyond said predetermined position.

18. In a time switch mechanism, in combination a switch having an operating element movable in one direction for operating the switch to one position and movable in the opposite direction for operating the switch to another position, a rotatable shaft adjacent said operating element, said shaft being rotatable in opposite directions, cam means on the shaft engaging said operating element for moving the operating element back and forth upon rotation of the shaft, said operating element being biased against said cam means, said cam means having an operating section causing substantial travel of the operating member upon rotation of the shaft when said operating section engages the operating element, said cam means also having a generally circular portion which causes substantially no travel of the operating element upon rotation of the cam means when said circular portion engages the operating element, the operating element transferring its engagement from the operating portion of the cam means to the circular portion thereof at a predetermined angular position of the cam means, said cam means being freely supported for rotation, whereby the cam means moves with snap action when it is rotated in the reverse direction past said predetermined position.

19. In a timer construction, the combination of, a timing motor, a cam, means for mounting the cam and for causing rotation thereof in at least one direction by said timer motor, said means including a free bearing for the cam and a lost motion drive mechanism between the timer motor and cam which permits free rotation of the cam in said one direction, switching means including a cam follower arranged to ride the cam and biased against the same, said cam and cam follower having engaging surfaces so correlated that upon rotation of the cam in the opposite direction it first moves the cam follower against its bias and upon reaching a predetermined angular position, the component of force of the cam follower tending to cause reverse rotation of the cam becomes neutralized, said cam when moved by the timing motor in said one direction past said predetermined position causing said component of force to reappear, the parts being arranged so that said component of force is sufficient to overcome all motion retarding forces on the cam means, whereby the reappearance of said component of force causes snap action rotation of the cam and permits snap action movement of said cam follower.

20. In a timer construction, the combination of, a first shaft, a timer motor for rotating said first shaft, a second shaft parallel with the first shaft and laterally spaced therefrom, a cam mounted on the first shaft and arranged for free rotation, means carried by said shafts for causing rotation of the cam in at least one direction by the timer motor, said means including a lost motion connection which permits free rotation of the cam in said one direction when driven in said direction by the timer motor, switching means including a cam follower arranged to ride the cam and biased against the same, said cam and cam follower having engaging surfaces so correlated that upon rotation of the cam in the opposite direction it first moves the cam follower against its bias and upon reaching a predetermined angular position the component of force of the cam follower tending to cause reverse rotation of the cam becomes neutralized, said cam when moved by the timing motor in said one direction past said predetermined position causing said component of force to reappear, the parts being arranged so that said component of force is sufficient to overcome all motion retarding forces on the cam means, whereby the reappearance of said component of force causes snap action rotation of the cam and permits snap action movement of said cam follower.

WAYLAND R. MILLER.

REFERENCES CITED

The following references are of record in the file of this patent:

UNITED STATES PATENTS

| Number | Name | Date |
|---|---|---|
| 1,708,619 | Hart | Apr. 9, 1929 |
| 1,891,946 | Porter | Dec. 27, 1932 |
| 1,922,946 | Greis | Aug. 15, 1933 |
| 1,970,432 | Porter | Aug. 14, 1934 |
| 2,076,371 | Hottenroth, Jr. et al. | Apr. 6, 1937 |
| 2,139,821 | Greenwood et al. | Dec. 13, 1938 |
| 2,183,886 | Hjulian | Dec. 19, 1939 |
| 2,288,636 | Malone | July 7, 1942 |
| 2,399,033 | Hudson | Apr. 23, 1946 |